(12) United States Patent
Kaertner et al.

(10) Patent No.: US 7,593,644 B2
(45) Date of Patent: *Sep. 22, 2009

(54) SYNCHRONIZATION OF LASERS AND RF SOURCES USING TIMING INFORMATION TRANSFER IN THE OPTICAL DOMAIN

(75) Inventors: Franz X. Kaertner, Newton, MA (US); Jung Won Kim, Boston, MA (US); Michael Perrott, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 635 days.

This patent is subject to a terminal disclaimer.

(21) Appl. No.: 11/125,800

(22) Filed: May 10, 2005

(65) Prior Publication Data

US 2005/0265406 A1 Dec. 1, 2005

Related U.S. Application Data (60) Provisional application No. 60/570,309, filed on May 12, 2004.

(51) Int. Cl.
*H04B 10/00* (2006.01)

(52) U.S. Cl. .................. 398/154; 398/155; 398/161; 398/102; 398/173; 398/175; 356/450; 356/460; 356/483; 356/459; 356/476; 372/30; 372/18; 372/32; 372/34; 372/36

(58) Field of Classification Search ............... 398/154, 398/98, 102, 161, 173, 175, 182, 183, 191; 398/188, 186, 200, 202, 203, 204, 206, 207; 356/450, 460, 483, 459, 476; 372/18, 32, 372/34, 38.01, 36, 30

See application file for complete search history.

(56) References Cited

U.S. PATENT DOCUMENTS

| | | | | | |
|---|---|---|---|---|---|
| 5,513,030 | A | * | 4/1996 | Epworth | 398/198 |
| 5,999,287 | A | * | 12/1999 | Davies et al. | 398/98 |
| 6,130,767 | A | * | 10/2000 | King et al. | 398/199 |
| 6,542,723 | B1 | * | 4/2003 | Tong et al. | 455/260 |
| 6,556,323 | B1 | * | 4/2003 | Mikkelsen et al. | 398/154 |
| 7,024,122 | B2 | * | 4/2006 | Uchiyama et al. | 398/155 |
| 7,058,312 | B2 | * | 6/2006 | Tong | 398/155 |
| 7,130,545 | B2 | * | 10/2006 | Lou et al. | 398/198 |
| 7,184,189 | B2 | * | 2/2007 | Hu et al. | 359/238 |
| 2004/0021056 | A1 | | 2/2004 | Holzwarth et al. | |

(Continued)

OTHER PUBLICATIONS

Ivanov et al., "Analysis of Noise Mechanisms Limiting the Frequency Stability of Microwave Signals Generated With a Femtosecond Laser" IEEE Journal of Selected Topics in Quantum Electronics, vol. 9, No. 4, Jul./Aug. 2003, pp. 1059-1065.

(Continued)

*Primary Examiner*—Hanh Phan
(74) *Attorney, Agent, or Firm*—Gauthier & Connors LLP (57) ABSTRACT

A RF-synchronization system includes a laser that creates pulse trains for synchronization. A modulation means transfers the timing information of the pulse train into an amplitude modulation of an optical or electronic system. A synchronization module changes the driving frequency of the modulation means until it reaches a phase-locked state with the pulse train.

28 Claims, 4 Drawing Sheets

U.S. PATENT DOCUMENTS

2008/0024787 A1* 1/2008 Kaertner et al. ............. 356/460

OTHER PUBLICATIONS

Kim et al., "Large-Scale Timing Distribution and RF-Synchronization For FEL Facilities" Proceedings of the 2004 FEL Conference, Aug. 2004, pp. 339-342.

Drullinger et al., "All-Optical Atomic Clocks" 2001 IEEE International Frequency Control Symposium and PDA Exhibition, Jun. 6-8, 2001, pp. 69-75.

Ramond et al., "Phase coherent link from optical to microwave frequencies via a 1GHz octave-spanning Ti:sapphire femtosecond oscillator" Conference on Lasers and Electro-Optics (CLEO 2002) Technical Digest, May 19-24, 2002, vol. 73, pp. 1-3.

Diddams, "Optical Clocks and Low Noise Frequency Synthesis Using Femtosecond Lasers," 2003 Digest of the LEOS Summer Topical Meetings, Jul. 14-16, 2003, pp. 45-46.

Cundiff et al., "Optical frequency synthesis based on mode-locked lasers" Review of Scientific Instruments, American Institute of Physics, vol. 72, No. 10, Oct. 2001, pp. 3749-3771.

"Analysis of Noise Mechanisms Limiting the Frequency Stability of Microwave Signals Generated with a Femtosecond Laser," Ivanov et al., *IEEE J. of Selected Topics in Quantum Electronics*, v. 9, n. 4 (Jul./Aug. 200).

"Femtosecond-laser-based synthesis of ultrastable microwave signals from optical frequency references," Bartels et al., *Optics Letters*, v. 30, n. 6 (Mar. 15, 2005).

* cited by examiner

SYNCHRONIZATION OF LASERS AND RF SOURCES USING TIMING INFORMATION TRANSFER IN THE OPTICAL DOMAIN

PRIORITY INFORMATION

This application claims priority from provisional application Ser. No. 60/570,309 filed May 12, 2004, which is incorporated herein by reference in its entirety.

This invention was made with government support under Grant No. N00014-02-1-0717, awarded by the Navy. The government has certain rights in the invention.

BACKGROUND OF THE INVENTION

The invention relates to the field of precision timing distribution which is especially critical for future accelerator facilities, and in particular for precise synchronization between low-level RF-systems in such facilities as well as to the extraction of microwave signals from optical clocks.

Seeding of free electron lasers operating in the EUV and soft X-ray regime with radiation generated via high harmonics from noble gases may result in a fully coherent X-ray laser. For seeding of such large-scale facilities spanning over several hundreds meters, it is critical to synchronize lasers and RF-systems with low (preferably sub-femtosecond range) timing jitter in a long-term stable arrangement.

To achieve this, the pulse repetition rate of an optical master oscillator implemented as a mode-locked laser is stabilized to a frequency standard or an ultra-low noise microwave oscillator that is clocking the facility. The pulse train is distributed to all critical sub-systems by use of timing stabilized fiber links, i.e. the pulse trains leaving different fiber links are perfectly synchronous. The RF- or optical sub-systems are then synchronized to the pulse trains at the fiber outputs.

Precise transfer of RF signals through fiber links has been demonstrated recently. For timing distribution over the large-scale free electron laser facility, timing stabilized fiber links will be used. If the fiber length is L, one can assume that no length fluctuations are faster than $(2 nL)/c$, where n is the refractive index of the fiber. Relative fiber expansion by temperature change is typically on the order of $10^{-7}/K$, which can be taken out by a length control loop by referencing the back reflected pulse from the fiber end with a later pulse from the mode-locked laser. This concept works to a precision fundamentally limited by the high frequency jitter of the laser from frequency of $c/(2 nL)$ up to the Nyquist frequency, i.e. half of the repetition rate. This jitter should be on the order of a few femtoseconds or below if 10-fs overall jitter needs to be achieved. This puts a serious constraint on the high frequency timing jitter of the optical master oscillator.

It has been shown that the extraction of a microwave signal from an optical pulse train emitted by a mode-locked laser using direct photo-detection is limited in precision by excess phase noise (see E. N. Ivanov, S. A. Diddams, and L. Hollberg, "Analysis of noise mechanisms limiting the frequency stability of microwave signals generated with a femtosecond laser," IEEE J. Sel. Top. Quant. Elec. 9, 1059-1065 (2003). A. Bartels, S. A. Diddams, C. W. Oates, G. Wilpers, J. C. Bergquist, W. H. Oskay, L. Hollberg, "Femtosecond-laser-based synthesis of ultrastable microwave signals from optical frequency references," Optics Letters 30, 667-669 (2005)). These publications are incorporated herein by reference in their entirety.

The origin of this excess noise has been identified to be amplitude-to-phase conversion in the photo-detection process, beam-pointing variations, and pulse distortions by photo-detector nonlinearities. In addition to this excess phase noise and timing jitter by photo-detector nonlinearities, the long-term synchronization stability is limited by the temperature dependence of semiconductor photodiodes. Thus, a new synchronization scheme to avoid these problems is highly desirable.

SUMMARY OF THE INVENTION

According to one aspect of the invention, there is provided a RF-synchronization system. The RF-synchronization system includes a laser that creates pulse trains for synchronization. A modulation means transfers the timing information of the pulse train into an amplitude modulation of an optical or electronic system. A synchronization module changes the driving frequency of the modulation means until it reaches a phase-locked state with the pulse train.

According to another aspect of the invention, there is provided a method of performing RF-synchronization. The method includes providing pulse trains from a laser source. Timing information of the pulse trains is transferred into an amplitude modulated optical or electrical signal. Also, the method includes changing the driving frequency until it reaches a phase-locked state with the pulse trains.

According to another aspect of the invention, there is provided a method of extracting a low jitter microwave signal from a mode-locked laser that serves as the clock work of an optical clock. The method includes providing pulse trains from a laser source. Timing information of the pulse trains is transferred into an amplitude modulated optical or electrical signal. Also, the method includes changing the driving frequency until it reaches a phase-locked state with the pulse trains.

According to another aspect of the invention, there is provided an optical synchronization system. The optical synchronization system includes a laser that creates pulse trains. A pair of modulators uses the pulse trains to formulate timing information that is transferred into an intensity imbalance between two optical beams by sending the pulse trains through the pair of amplitude modulators.

According to another aspect of the invention, there is provided a method of performing optical synchronization. The method includes providing a laser that creates pulse trains. Timing information is formulated using the pulse trains. The method also includes transferring into an intensity imbalance between two optical beams by sending the pulse trains through a pair of amplitude modulators.

DETAILED DESCRIPTION OF THE INVENTION

Figure 1:
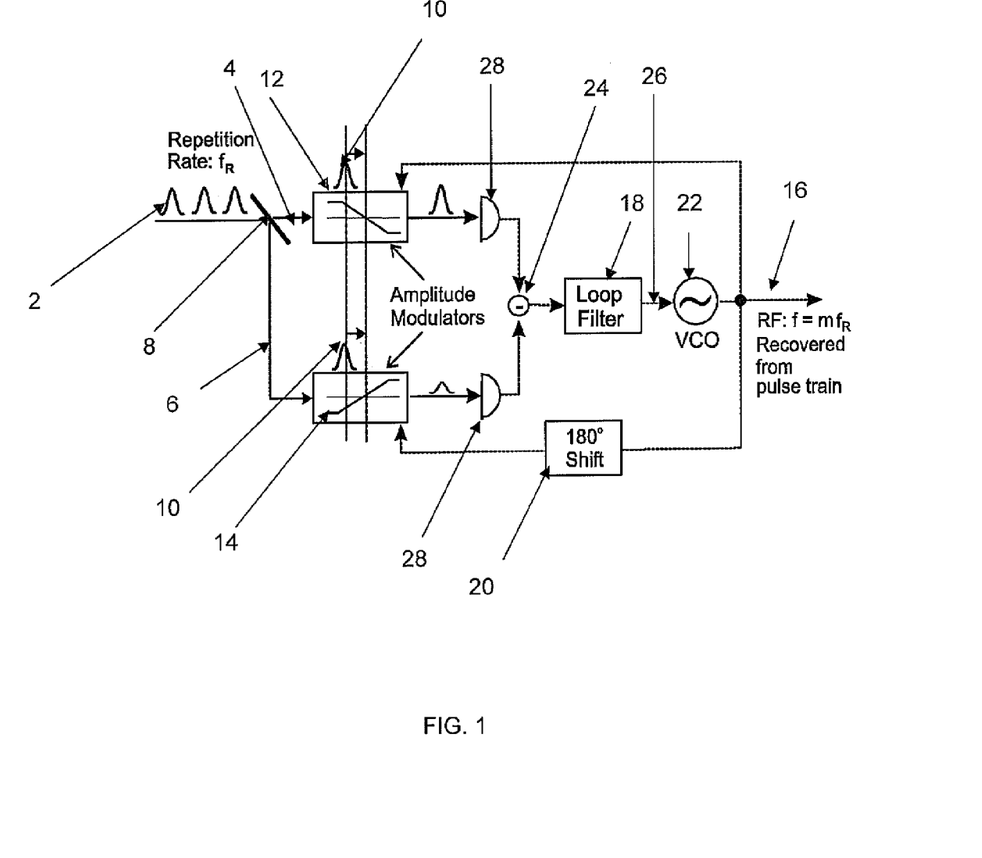
FIG. 1 is a schematic diagram illustrating a synchronization scheme based on a transfer of timing information into an intensity imbalance in the optical domain.

The invention suppresses excess noise due to the photo-detection process as shown in FIG. 1. While still in the optical domain, timing information 2 is transferred into an intensity imbalance via a beam splitter 8 between two beams 4, 6 by sending a pulse train 10 through a pair of amplitude modulators 12, 14. The modulators 12, 14 are driven by an output signal 16 from a voltage-controlled oscillator (VCO) 22 with 180° phase difference 24. The intensity difference 24 is detected with balanced detectors 28 and this signal 26 controls the input to the VCO via a loop filter 20.

When the pulse train hits the amplitude modulators 12, 14 at non-balanced points of the driving RF-signal, intensity imbalance 24 will be generated between two beams 4,6. The error signal 26 generated from the balanced detector 28 will drive the VCO 22 to tune its frequency until the pulse train sits on the balanced points of the RF-signal. Using such a scheme, we can shift the problem of photodetection on the electronic side to the optical side and eliminate the nonlinearity problems in the photodetector.

The invention described shifts the problem of photo-detector nonlinearities on the electronic side to the realization of amplitude modulators with drift-free bias points on the optical side. The 180° out-of-phase amplitude modulators can be realized by a Mach-Zehnder interferometer with a phase modulator in one arm. However, this scheme will suffer from the phase drifts in the interferometer arms due to temperature fluctuations, air currents, and mirror vibrations. To remove these problems, the interferometer is implemented in a Sagnac-loop configuration with a phase modulator inside the loop.

A synchronization scheme based on free-space Sagnac-loop interferometer and Ti:sapphire laser is demonstrated as a specific implementation embodiment of the general idea in FIG. 1. Other implementations can be formulated using the general idea of the invention described herein.

Figure 2:
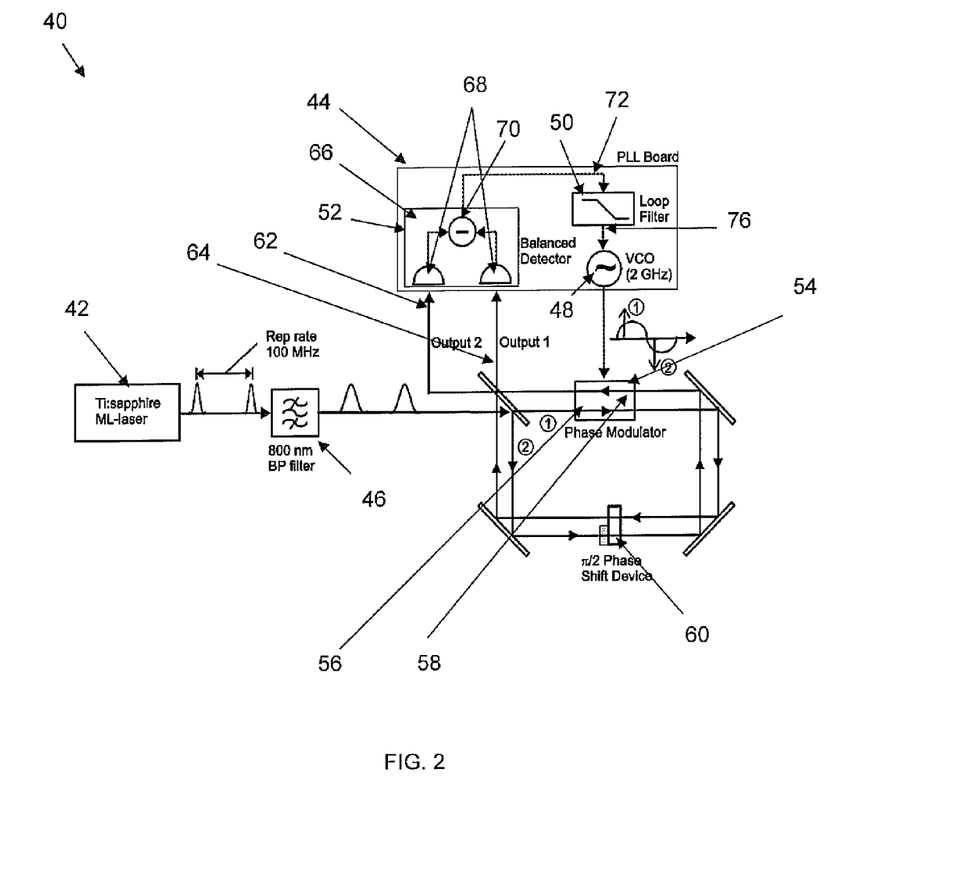
FIG. 2 is a schematic diagram illustrating a synchronization scheme for extraction of a 2 GHz signal from a 100 MHz repetition rate Ti:sapphire laser.

FIG. 2 shows the inventive synchronization scheme 40. A 100 MHz repetition rate Ti:sapphire mode-locked laser 42 is used as the pulse source. After passing a bandpass filter 46 at 800 nm to limit the pulsewidth to about 100 fs, the input optical pulse train is sent into a Sagnac-loop 44. A resonant phase modulator 48 at 2 GHz is positioned in the Sagnac-loop 44 in such a way that the optical delay between counter propagating pulses 56, 58 at the phase modulator 54 is set to half of the RF-signal period via the $\pi/2$ phase shift device 60. This assures that the two pulses 56, 58 experience opposite phase modulation.

Output beams 62, 64 are detected by a balanced detector 66 that generates a difference signal 68 between the two photocurrents from the two Si pin-photodiodes 68. An output current 72 from a balanced detector 66 is transferred to a passive loop filter 50 (type II, order 2 topology) for proper filtering. The passive loop filter 50 structure is advantageous over an active counterpart since it allows a simple circuit and also ensures excellent noise performance.

A loop filter output signal 76 drives a VCO 78 and changes the driving frequency of the phase modulator 54 until it reaches a phase-locked state by balancing the two output powers from the interferometer. This closes the phase-locked loop operation. For a stable and drift-free biasing of the interferometer, an effective quarter-wave plate is inserted in one of the beams using a thin-film coating covering only half of the substrate. A very stable and drift-free phase-locked operation is achieved with this scheme.

The phase noise of the RF-output signal from the VCO is characterized in two ways: (i) by the frequency discriminator technique using a commercial phase noise measurement setup PN9000 from Aeroflex; (ii) by mixing the output signal of the VCO in quadrature with the 2 GHz component of the directly detected pulse train in order to measure the relative phase noise between the optical pulse train and the extracted RF-signal. Using technique (i), the input is delayed and mixed with itself in quadrature to extract the phase noise of the input. Technique (ii) is a standard technique to measure the residual phase noise between two locked RF-signals where an oscilloscope is used to monitor that the two RF-signals are in quadrature, and a vector signal analyzer is used to measure the noise spectrum.

Figure 3:
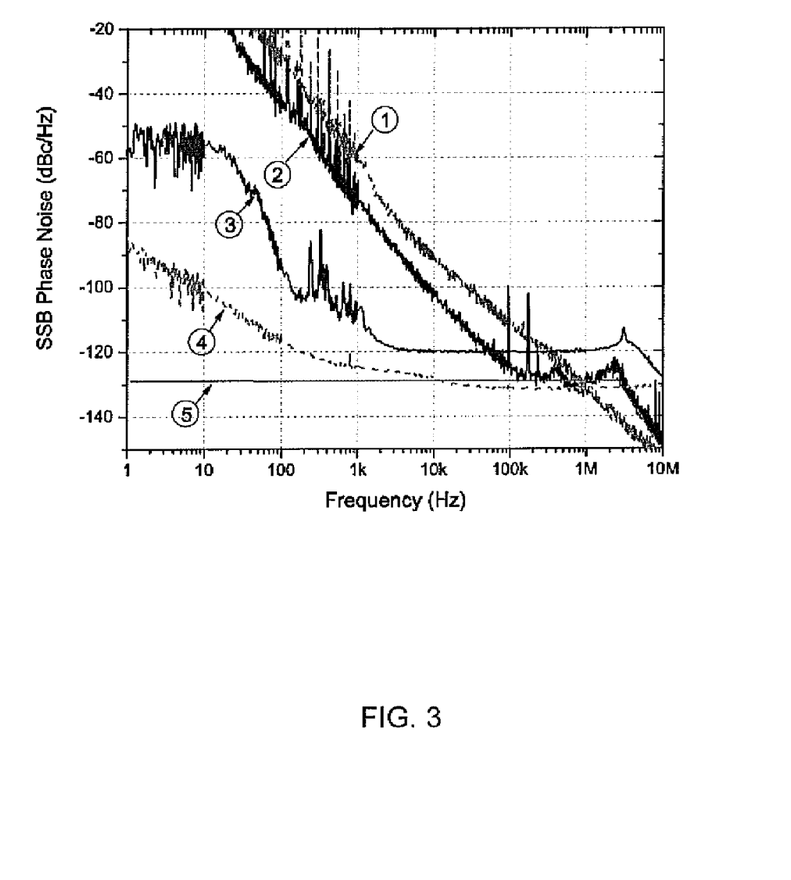
FIG. 3 is a schematic diagram illustrating a phase noise measurement arrangement.

The measured single-sideband (SSB) phase noise spectra from 1 Hz to 10 MHz are shown in FIG. 3. Curve (1) shows the phase noise spectrum of the free-running VCO measured with the Aeroflex phase noise measurement system. Curve (2) shows the phase noise measured by the same method when the system is locked. The locking is clearly visible in the spectrum covering the range of 100 kHz to 10 MHz. At lower frequencies, the phase noise of the Ti:sapphire pulse train dominates. The phase noise level of the free-running Ti:sapphire laser is enhanced by 26 dB due to the frequency multiplication by 20 to lift the repetition rate of the mode-locked laser (100 MHz) to the VCO frequency (2 GHz).

To verify the assumption that the phase noise of the laser dominates at low frequencies in the frequency discriminator measurement results, one can measure the relative phase noise between the pulse train and the RF-signal by using the second phase noise characterization method. The result is shown in curve (3) of FIG. 3. Due to the noise floor of the vector signal analyzer (curve (4)) and excess noise in the photo-detector that generates the reference signal, the high frequency noise floor is increased in comparison to technique (i). But this measurement clearly shows that the noise increase at low frequencies in curve (2) is the phase noise of the free-running Ti:sapphire laser. This result suggests that better shielding of the laser against environmental perturbations, higher pulse repetition rate as well as the use of a VCO with lower phase noise, will lead to drastic improvements in the timing jitter of the microwave signal extracted from the laser source.

Note that the origin of the enhanced phase fluctuations below 1 kHz may be due to either mechanical vibrations in the Sagnac-loop or excess phase noise in the photo-detection process resulting from converted laser amplitude fluctuations. Based on the current system and measurements, the relative timing jitter between the RF-signal and the pulse train integrated from 100 Hz to 10 MHz can be estimated by the area underneath curve (5), which lines up with the high frequency noise of the Aeroflex measurement (curve (2)) and results in about 60 fs timing jitter.

The following references demonstrate timing jitters that are not as low as using pure microwave techniques R. K. Shelton, S. M. Foreman, L.-S. Ma, J. L. Hall, H. C. Kapteyn, M. M. Murnane, M. Notcutt, and J. Ye, "Subfemtosecond timing jitter between two independent, actively synchronized, mode-locked lasers", Opt. Lett. 27, 312-314 (2002). A. Bartels, S. A. Diddams, T. M. Ramond, and L. Hollberg, "Mode-locked laser pulse trains with subfemtosecond timing jitter synchronized to an optical reference oscillator", Opt. Lett. 28, 663-665 (2003). The teachings of both of these documents are incorporated herein by reference in their entirety.

Moreover, the following the reference demonstrates high-speed photodetection using purely optical means T. R. Schibli, J. Kim, O. Kuzucu, J. T. Gopinath, S. N. Tandon, G. S. Petrich, L. A. Kolodziejski, J. G. Fujimoto, E. P. Ippen, and F. X. Kaertner, "Attosecond active synchronization of passively mode-locked lasers by balanced cross correlation", Opt. Lett. 28, 947-949 (2003). The teachings of this document are incorporated herein by reference in their entirety.

However, with improved system design, the invention will be able to reduce the relative jitter to the sub-femtosecond range over the full Nyquist bandwidth in the near future. For long-term stability, a fiber implementation of the Sagnac loop is preferable. This will eliminate a large part of the drift problems in the low frequency range. In addition, a lower-noise VCO combined with a higher phase detector gain of phase-locked loop will dramatically reduce the phase noise of high frequency range. Numerical simulation also shows that scaling down to sub-femtosecond timing jitter is possible with the improved design.

Figure 4:
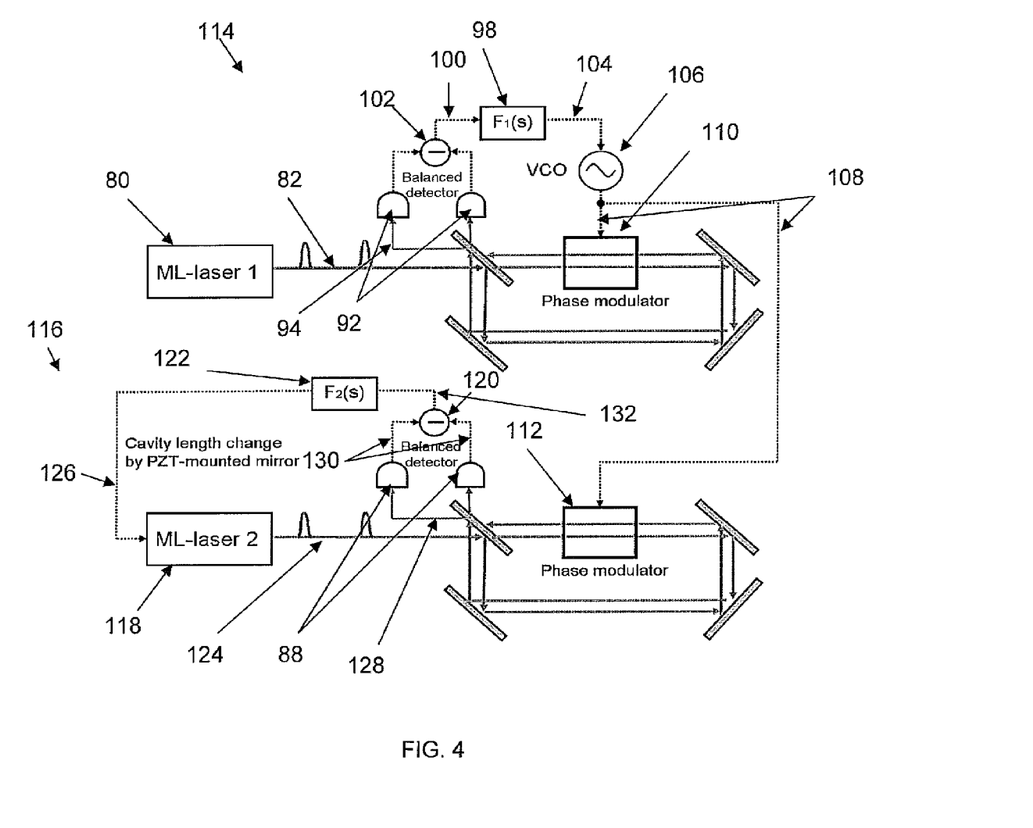
FIG. 4 is a graph demonstrating the single-sideband phase noise measurement results.

Synchronization is necessary not only between optical and RF-subsystems but also between different optical systems, for example, between photo-injector laser and the master oscillator. FIG. 4 shows how the optical-to-RF synchronization technique can be used to synchronize two pulsed lasers with each other. A first RF-subsystem 114 includes a first laser 80 that outputs a signal 82, a balanced detector 92 that receives output signals 94 of a phase modulator 110, and a bandpass filter 98 having a transfer function $F_1(s)$. A bandpass filter 98 receives an error signal 100 from a difference operator 102. The filter 98 provides an output signal 104 to a VCO 106. The VCO 106 provides output signals 108 to phase modulators 110, 112. The second RF-subsystem 116 includes a second laser 118 that outputs a pulse signal 124, a balanced detector 88 that receives output signals 128 from the phase modulator 112 Note the balanced detector 88 comprises the two detectors and the difference operator and a bandpass filter 122 having a transfer function $F_2(s)$. The filter 122 receives the signal 132 and produces output signal 134 that is used to drive the second laser 118.

Essentially the synchronization between the two RF-subsystems 114, 116 is performed by first locking the signal 82 to the pulse train from the first laser 80. This locks the signal 108 that drives the phase modulator 112. However, instead of a driving VCO, the error signal 120 from balanced detector 88 drives a piezoelectric transducer inside the mode-locked laser ML2 86 to control the repetition rate of the second laser 118. In this way, an effective synchronization of multiple lasers is also possible by locking lasers to the same RF signal synchronized to one laser.

Although the present invention has been shown and described with respect to several preferred embodiments thereof, various changes, omissions and additions to the form and detail thereof, may be made therein, without departing from the spirit and scope of the invention.

What is claimed is:

1. A RF synchronization system comprising:
   a laser that creates pulse trains for synchronization;
   a modulation means that transfers the timing information of pulse trains from a modelocked laser source with respect to an RF signal to be tightly synchronized to the pulse stream into an amplitude modulated optical signal; and
   a synchronization module that changes the driving frequency of the RF-signal and with it of said modulation means until it reaches a phase-locked state with the pulse trains, said synchronization module using a filter that receives an error signal so as to tune the frequency of said timing information until said pulse train arrives to a selective balance point.

2. The RF-synchronization system of claim 1, wherein said modulation means is a phase modulator in a Sagnac loop.

3. The RF-synchronization system of claim 1, wherein said laser comprises a Ti:sapphire mode-locked laser or a fiber laser.

4. The RF-synchronization system of claim 1, wherein said synchronization module comprises a VCO so as to form a microwave output signal.

5. The RF-synchronization system of claim 4, wherein said synchronization module comprises a balanced detector that generates a difference signal.

6. The RF-synchronization system of claim 5, wherein said synchronization module comprises a passive loop filter that receives said difference signal and performs filtering.

7. The RF-synchronization system of claim 6, wherein said synchronization module comprises a VCO that receives the output of said passive loop filter and drives said modulation means.

8. A method of performing RF-synchronization comprising:
   providing pulse trains from a laser source;
   transferring the timing information of pulse trains from a modelocked laser source with respect to an RF signal to be tightly synchronized to the pulse stream into an amplitude modulated optical or electrical signal; and
   changing the driving frequency of the timing information of the pulse trains until it reaches a phase-locked state with the pulse using a passive filter that receives an error signal so as to tune the frequency of said timing information until said pulse train arrives to a selective balance point.

9. The method of claim 8, wherein said laser source comprises a Ti:sapphire mode-locked laser or a fiber laser.

10. The method of claim 8, wherein changing the driving frequency comprise producing output signals that includes providing a VCO so as to form a microwave signal.

11. The method of claim 10, wherein producing said output signals comprises generating a difference signal.

12. The method of claim 10, wherein producing said output signals comprises filtering said difference signal.

13. The method of claim 12, wherein producing said output signals comprises driving at least one phase modulator.

14. The method of claim 13 further comprising providing a bandpass filter that receives as input said pulse signal.

15. The method of claim 8, wherein said pulse trains comprise a repetition rate of at least 100 MHz.

16. A method of extracting a low jitter microwave signal from a mode-locked laser that serves as the clock work of an optical clock comprising:
   providing a laser that creates pulse trains;
   transferring the timing information of optical pulse trains from a modelocked laser source with respect to an RF signal to be tightly synchronized to the pulse stream into an amplitude modulated optical signal;
   changing the driving frequency of the timing information of the optical pulse trains until it reaches a phase-locked state with the optical pulse train using a filter that receives an error signal so as to tune the frequency of said timing information until said pulse train arrives to a selective balance point.

17. The method of claim 16, wherein changing the driving frequency requires a VCO so as to form a microwave output signal.

18. The method of claim 16, wherein changing the driving frequency requires a balanced detector that generates a difference signal.

19. The method of claim 18, wherein changing the driving frequency requires a passive loop filter that receives said difference signal and performs filtering.

20. The method of claim 16, wherein said pulse trains comprise a repetition rate of at least 100 MHz.

21. An optical synchronization system comprising
   a laser that creates pulse trains and
   a pair of modulators that uses said pulse trains to formulate timing information that is transferred into an intensity imbalance between two optical beams by sending the pulse signals through said pair of amplitude modulators so as to produce an error signal used by a filter in tuning the frequency of said timing information until said pulse train arrives to a selective balance point.

22. The optical synchronization system of claim 21, wherein said laser comprises a Ti:sapphire or fiber mode-locked laser.

23. The optical synchronization system of claim 21 further comprising a bandpass filter that receives as input said pulse signal.

24. The optical synchronization system of claim 21, wherein said pulse signals comprise a repetition rate of at least 100 MHz.

25. A method of performing optical synchronization comprising providing a laser that creates pulse trains and
formulating timing information by using said pulse trains; and
transferring into an intensity imbalance between two optical beams by sending the pulse signals through a pair of amplitude modulators so as to produce an error signal used by a filter in tuning the frequency of said timing information until said pulse train arrives to a selective balance point.

26. The method of claim 25, wherein said laser comprises a Ti:sapphire or fiber mode-locked laser.

27. The method of claim 25 further comprising a bandpass filter that receives as input said pulse trains.

28. The method of claim 25, wherein said pulse trains comprise a repetition rate of at least 100 MHz.

* * * * *

UNITED STATES PATENT AND TRADEMARK OFFICE
CERTIFICATE OF CORRECTION

PATENT NO. : 7,593,644 B2  Page 1 of 1
APPLICATION NO. : 11/125800
DATED : September 22, 2009
INVENTOR(S) : Kaertner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Twenty-first Day of September, 2010

David J. Kappos
*Director of the United States Patent and Trademark Office*